(No Model.)                                              2 Sheets—Sheet 1.

J. R. SEVERANCE.
FEEDING AND PACKING MECHANISM FOR GRAIN BINDERS.

No. 281,570.                    Patented July 17, 1883.

WITNESSES
Wm A. Skinkle
Geo. W. Young

INVENTOR
James R. Severance
By his Attorneys
Baldwin, Hopkins & Peyton (No Model.) 2 Sheets—Sheet 2.

J. R. SEVERANCE.
FEEDING AND PACKING MECHANISM FOR GRAIN BINDERS.

No. 281,570. Patented July 17, 1883.

WITNESSES
Wm A. Skinkle
Geo W Young

INVENTOR
James R. Severance.
By his Attorneys

UNITED STATES PATENT OFFICE.

JAMES R. SEVERANCE, OF FREMONT, OHIO.

FEEDING AND PACKING MECHANISM FOR GRAIN-BINDERS.

SPECIFICATION forming part of Letters Patent No. 281,570, dated July 17, 1883.

Application filed April 16, 1883. (No model.)

*To all whom it may concern:*

Be it known that I, JAMES R. SEVERANCE, of Fremont, in the county of Sandusky and State of Ohio, have invented certain new and useful Improvements in Feeding and Packing Mechanism for Grain-Binders, of which the following is a specification.

My invention relates to improvements applicable to rotary feeding and packing mechanism of the class in which arms or teeth are caused alternately to project beyond or through slots of shields or casings to engage the grain delivered within their reach and feed it along, and to retract within their casings to withdraw from the grain after having fed it to the desired extent.

My object, mainly, is to provide simply-constructed positively-actuated mechanism in which the feeding or packing teeth have a planetary motion imparted to them—that is to say, are actuated by a central shaft about the axis of which they rotate, while also turning about their own axes.

The accompanying drawings show those parts only of suitable mechanism, illustration of which is thought to be sufficient to show an appropriate adaptation of my invention.

Figure 1:
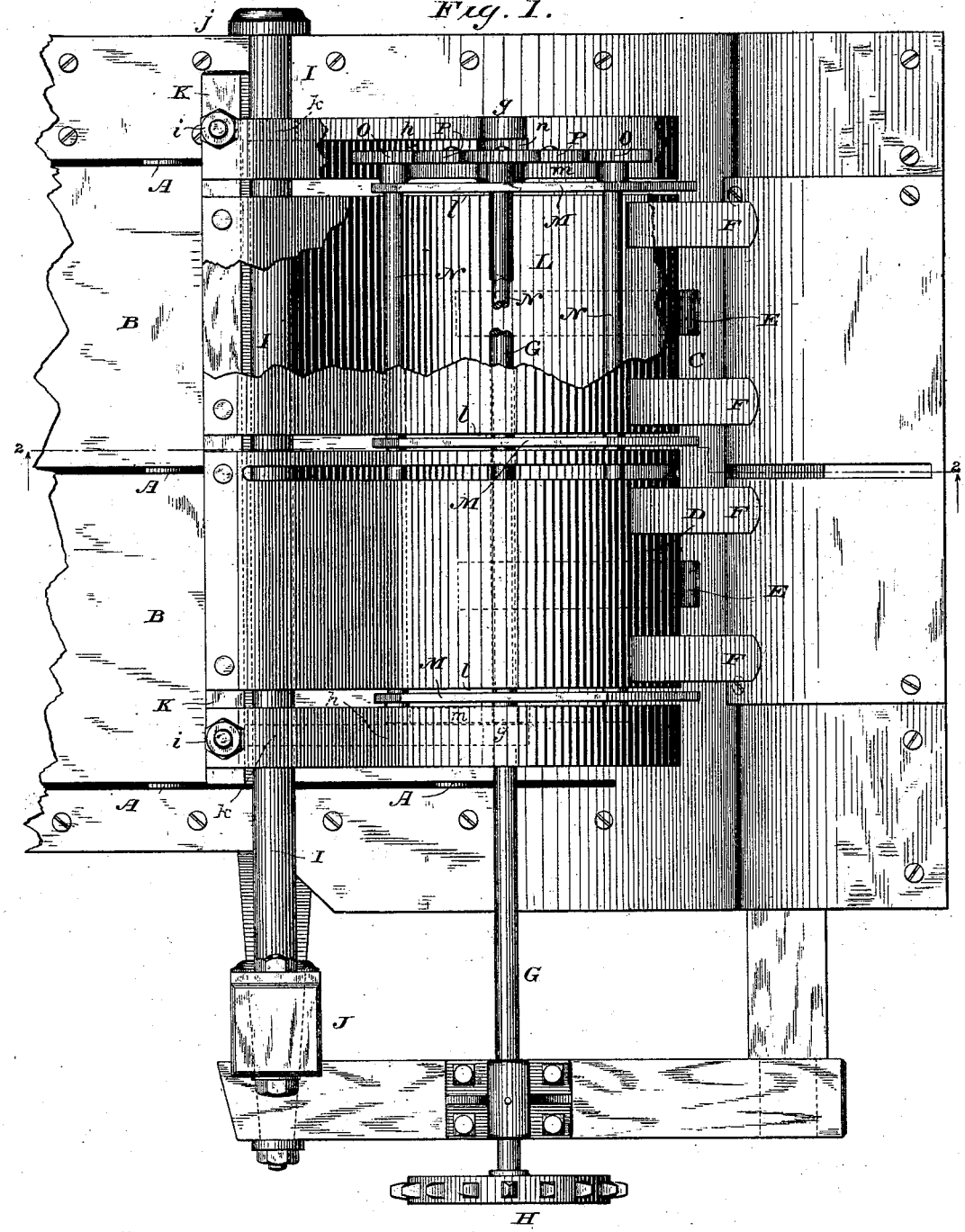
Figure 2:
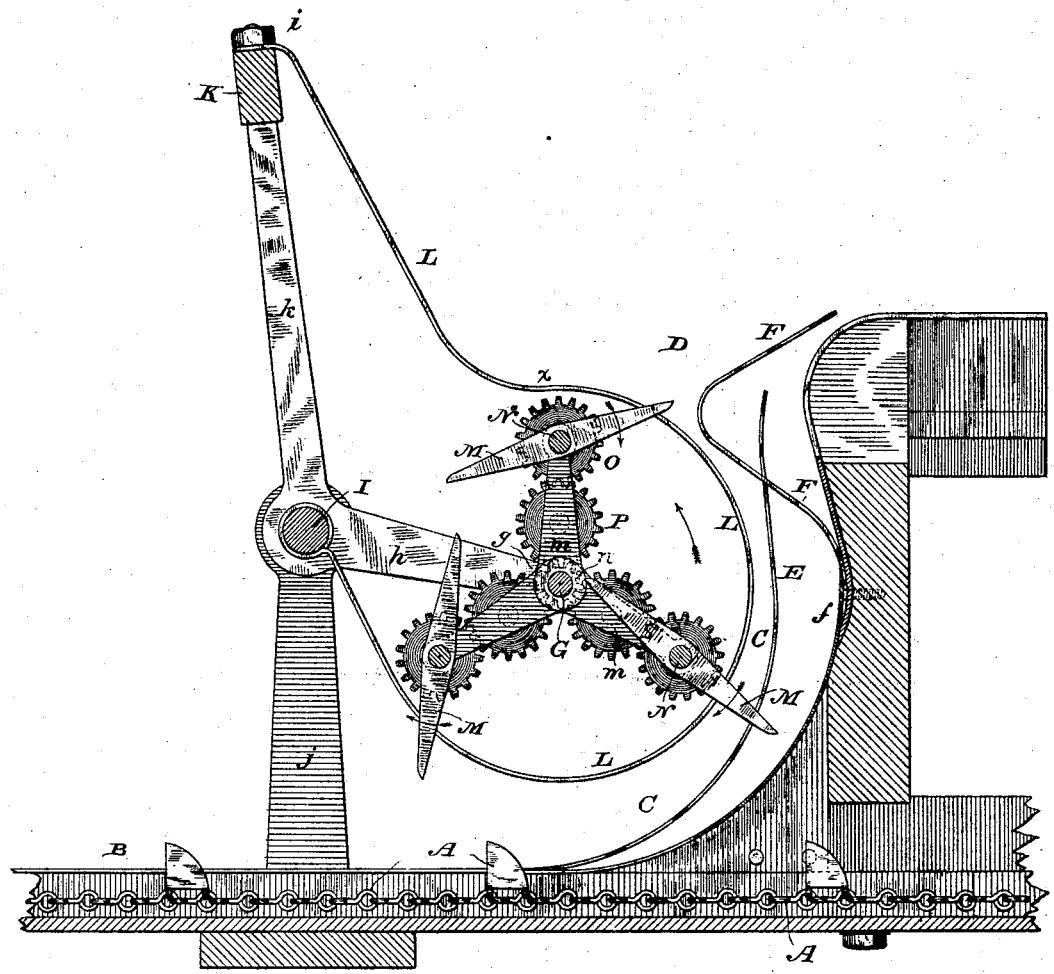

Figure 1 is a plan view with parts broken away, and Fig. 2 is a view partly in front elevation and partly in section on the line 2 2 of Fig. 1.

In this instance my improvements are shown as ingrafted upon a grain-binder of the "low-down" type—that is, one in which the grain, instead of being carried over the driving-wheel of the machine to the binding-receptacle, is delivered to a binder table or receptacle located but slightly above the level of the grain-platform. As shown, the binding-receptacle is designed to be arranged at about one foot (more or less) above the level of the grain-platform and inside of and close to the driving-wheel of the machine. The grain is delivered to within reach of the feeding and packing devices in suitable way, as by a carrier, A, composed of endless chains and teeth, the teeth working through slots in the grain-platform B. A grain passage-way or throat, C, leads from the platform to the gaveling-place or binding-receptacle D. Curved spring-arms E, each fixed in position at one end, and of which any desired number may be used, serve to automatically adjust the area of the passage-way, so as to best adapt it to the amount of grain being forced along it, in manner further on to be described. Bent spring-fingers F, of which four are shown, co-operate with the arms E in adjusting the area of the passage-way to the varying thicknesses of the stream of grain. Each finger F is fixed at one end, as at $f$, (the fingers may be hinged at $f$ and acted upon by separately-made springs,) and projects across or nearly across the throat or passage-way C when in its normal position. The free ends of the fingers serve to partly constitute the bottom of the grain-receptacle D. The arms E project at their free ends between the fingers F, but terminate short of the bent free ends of the fingers, so as not to project into the grain accumulated above the fingers. A shaft, G, is rotated in suitable way, as by a sprocket-wheel, H, continuously driven, while the machine is in motion, by a chain from any appropriately-rotated shaft of the machine. The rotating shaft G actuates the feeding and packing mechanism, of which it constitutes a part, and is suitably mounted in fixed front and rear bearings, $g\ g$, which are shown as formed at the ends of arms $h\ h$, firmly attached to a supporting-rod, I, fixedly mounted at its ends in front and rear standards, J $j$. A cross-bar, K, above and parallel with the rod I, is supported by arms $k\ k$, secured to this rod. Each arm $k$ is formed with one of the arms $h$, and is tenoned, rounded, and threaded at its upper end, and passed through the bar K. Nuts $i\ i$ serve to firmly unite the upper ends of the arms $k$ and the cross-bar. A bent or curved metallic plate constitutes a shield or casing, L, for the packing and feeding devices, and is provided with slots $l$, corresponding in number with the number of groups or sets of teeth which project through the slots to act on the grain. The casing L is partly of circular curvature and partly of irregular curvature, and is supported by being secured to the rod I and bar K. As in this instance shown, the casing is of substantially regular curvature, or concentric or nearly concentric with the actuating-shaft G, from or near the rod I to about the point $x$. This casing serves as one side or boundary of the passage-way C, and the yielding arms E and fingers F press the grain toward it, as will readily be seen. It will also be seen that by extending the shield-plate to the cross-bar K, instead of securing both of its ends to the rod I, (as they may be secured,) the plate is made to constitute not only a part of the bottom of the receptacle and one side thereof, but to form a high boundary at such side, and thus afford to the grain more or less protection from the wind. The feeding and packing teeth M, as shown in this instance, are in three sets or groups, with three teeth to each group, and with each tooth supported at its middle and pointed at both ends, so as to be double-acting, as will soon be made apparent. The teeth M are connected with the shaft G, so as to be carried thereby and rotate therewith. As shown, front and rear spiders or radial arms, m, and shafts N, loosely mounted in bearings in the outer ends of the spider-arms, constitute the connection between the teeth and their actuating-shaft G. The spiders are rigidly secured to this shaft, and the teeth are fixed at their middles to their shafts N. The rotary motion of the teeth M about their own axes while they rotate about a common axis (the shaft G) is positively imparted to them by a system of "planetary" gearing, which, when double-ended teeth are employed, as in this instance shown, gives a half-revolution to the shafts N for every complete revolution of the actuating-shaft. This planetary gearing consists of the fixed central pinion, n, the gears O, one for each shaft N and fixed thereto, and intermediate or idle gears, P, mounted on stud-shafts secured to the arms of the rear spider, m. The gears O are twice the size of the central or controller pinion, n, which fits loosely around the actuating-shaft, and is fixed to the rear supporting-arm h of this shaft.

From the above description it will be understood that the feeding or packing teeth are caused to act on the grain alternately with their opposite ends; that a slow, positive, and regular movement is imparted to them as they rotate in a direction opposite of that in which their actuating-shaft turns, so as to gradually and smoothly withdraw them from the grain fed along by them, and again present them properly to the incoming grain.

I do not claim herein any features of novelty in the endless carrier, the platform, or the framing of the machine, such features, as well as any other novel devices not hereinafter included in the claims, and which may be more or less fully here divulged, being reserved to be claimed by me elsewhere. On the other hand, I do not wish to be understood as confining my invention herein claimed to the details of construction and precise arrangements of parts described and illustrated, as my improvements may be modified in various respects without departure from my invention. For instance, instead of double-ended or cross teeth, single-ended teeth may be used, with driven gears of the same diameter as the controller-pinion, so as to cause the teeth to make a complete revolution about their respective axes for every revolution about their common axis—the shaft G; and the curvature of the shield may be varied to suit variations in the motion imparted to the teeth, as well as to adapt the feeding and packing mechanism for elevating the grain more or less, and especially when the feeding and packing mechanism is adapted to deliver the grain horizontally, or nearly so, the spring arms and fingers of the passage-way may be omitted; but I prefer an organization, as shown, in which the fingers are supported at such point that the pressure of the grain in the receptacle has a tendency to retain them across the grain passage-way, so that grain cannot pass back into the passage-way from the receptacle.

I claim as of my own invention—

1. The shield or casing of the feeding and packing mechanism, constituting one side and a portion of the bottom of the grain-receptacle, and one side of the grain passage-way leading to the receptacle, substantially as and for the purpose hereinbefore set forth.

2. The combination of the shield or casing forming one side and a portion of the bottom of the grain-receptacle, and the bent spring-fingers co-operating therewith to complete the bottom of the receptacle, to which the grain is delivered by the feeding and packing mechanism, substantially as hereinbefore set forth.

3. The combination of the spring-arms and bent spring-fingers of the passage-way with the feeding and packing mechanism and its shield or casing, substantially as and for the purpose hereinbefore set forth.

4. The grain-feeding teeth rotating about a common axis, as well as about their own axes, respectively, whereby they are projected beyond and withdrawn within their casing, substantially as hereinbefore set forth.

5. The combination, substantially as hereinbefore set forth, of the teeth rotating about their own axes, their casing, the shaft by connection with which they are actuated and about which they rotate, and the passage-way for the grain.

6. The combination of the teeth rotating about their own axis, their casing, the shaft by connection with which they are actuated and about which they rotate, the passage-way for the grain, means for delivering the grain to the action of the teeth, and the grain-receptacle, to which the grain is delivered by the teeth, substantially as and for the purpose hereinbefore set forth.

7. The combination, substantially as hereinbefore set forth, of the grain-feeding teeth, their turning shafts, the actuating-shaft, and the planetary gearing, for the purpose described.

8. The combination of the slotted casing, the rotating actuating-shaft supported therein, the spiders secured to the actuating-shaft, the shafts loosely mounted in the spider-arms, the teeth and gears fixed to said shafts, the idle-gears, and the fixed central pinion, substantially as and for the purpose hereinbefore set forth.

9. The combination of the double-ended teeth M, their rotating shafts, the gears fixed to said shafts, the idle-gears, the actuating-shaft, and the fixed central pinion of half the size of the gears, substantially as and for the purpose hereinbefore set forth.

In testimony whereof I have hereunto subscribed my name.

JAMES R. SEVERANCE.

Witnesses:
H. S. BUCKLAND,
R. P. BUCKLAND.